United States Patent
Weise

(10) Patent No.: US 6,236,959 B1
(45) Date of Patent: May 22, 2001

(54) SYSTEM AND METHOD FOR PARSING A NATURAL LANGUAGE INPUT SPAN USING A CANDIDATE LIST TO GENERATE ALTERNATIVE NODES

(75) Inventor: David Neal Weise, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/103,057

(22) Filed: Jun. 23, 1998

(51) Int. Cl.$^7$ .................................................. G06F 17/27
(52) U.S. Cl. .................................................. 704/9
(58) Field of Search .................... 704/9, 1, 10, 2, 704/7, 251, 252, 254, 255, 257; 707/530, 531, 532, 533, 534

(56) References Cited

U.S. PATENT DOCUMENTS

| | | | | |
|---|---|---|---|---|
| 5,434,978 | * | 7/1995 | Dockter et al. ...................... | 709/230 |
| 5,555,169 | * | 9/1996 | Namba et al. ........................... | 704/9 |
| 5,740,425 | * | 4/1998 | Povilus ................................. | 707/100 |
| 5,784,489 | * | 7/1998 | Van Vliembergen et al. ...... | 382/192 |
| 5,946,648 | * | 8/1999 | Halstead, Jr. et al. ................... | 704/9 |
| 5,963,893 | * | 10/1999 | Halstead, Jr. et al. ................... | 704/9 |
| 6,016,467 | * | 1/2000 | Newstead et al. ....................... | 704/9 |
| 6,035,269 | * | 3/2000 | Kim ......................................... | 704/9 |
| 6,052,693 | * | 4/2000 | Smith et al. ........................... | 707/104 |

FOREIGN PATENT DOCUMENTS

410301596 * 11/1998 (JP).

* cited by examiner

*Primary Examiner*—Joseph Thomas
(74) *Attorney, Agent, or Firm*—Kilpatrick Stockton LLP

(57) ABSTRACT

An improved natural language parser uses a directed search template set to identify problematic word sequences, thus reducing processing time while increasing accuracy. The directed search template set is used to identify problematic input spans or portions of input spans. A problematic input span is one that contains at least one word or phrase that can be constructed in alternative ways. Problematic input spans can reduce the efficiency of a natural language parser and can result in the production of an inaccurate parse tree. Once a problematic span has been identified, the improved parser generates alternative parses for the problematic portion of the input span. This on-the-fly alternative parse generation permits the parser to consider the alternatives as early in the parse process as possible, thus reducing the overall time needed to parse a problematic input span.

25 Claims, 13 Drawing Sheets

Input Span: "They considered him a fool."

NODE CHART

| Node |
|---|
| They - N |
| considered - V |
| him - N |
| a - DET |
| fool - N |
| fool - V |
| They - NP |
| considered - VP |
| him - NP |
| a - DETP |
| fool - NP |
| a fool - NP |
| considered him - VP |
| considered him a fool - VP |

206a–206n

CANDIDATE LIST

| GOODNESS MEASURE | NODE |
|---|---|
| $X_1$ | They - N |
| $X_2$ | considered - V |
| $X_3$ | him - N |
| $X_4$ | a - DET |
| $X_5$ | fool - N |
| $X_6$ | fool - V |

FIG. 2c

CANDIDATE LIST — 404

| | |
|---|---|
| VP | They were (goodness 10) |
| VP | were worried$_{verb}$ (goodness 12) |
| VP | were worried$_{adj}$ (goodness 5) |
| VP | worried$_{verb}$ about (goodness 7) |
| VP | worried$_{verb}$ about the future (goodness 31) |
| AJP | worried$_{adj}$ about the future (goodness 29) |

406

NODE CHART — 402

| | |
|---|---|
| NP | They |
| VP | were |
| VP | worried$_{verb}$ |
| AJP | worried$_{adj}$ |
| PP | about |
| DETP | the |
| NP | future |
| NP | the future |
| PP | about the future |

FIG.4a

SYSTEM AND METHOD FOR PARSING A NATURAL LANGUAGE INPUT SPAN USING A CANDIDATE LIST TO GENERATE ALTERNATIVE NODES

TECHNICAL FIELD

The present invention relates generally to natural language parsers and more particularly to a method for making rule-based natural language parsers more efficient by identifying problematic parses and generating alternative parses.

BACKGROUND OF THE INVENTION

A natural language parser is a program that takes a span, usually a sentence, of natural language (e.g., English) text as input and produces as output for that span a data structure, usually referred to as a parse tree. This parse tree typically represents the syntactic relationships between the words in the input span. In other words, the parse tree typically represents a sentence-like construction of the input span.

Natural language parsers have traditionally been rule-based. Such rule-based parsers store knowledge about the syntactic structure of the natural language in the form of syntax rules, and apply these rules to the input text span to obtain the resulting parse tree. The parser usually stores information about individual words, such as what parts-of-speech they can represent, in a dictionary or "lexicon". The dictionary or lexicon is accessed by the parser for each word in the input span prior to applying the syntax rules.

To generate a parse tree, a conventional parser first creates one or more leaf nodes for each word of the input span. Each leaf node indicates a possible part of speech of the word. For example, the word "part" can be used as a noun or a verb part-of-speech. A leaf node contains a single word and its associated part of speech. An intermediate-level node contains leaf nodes as its basic elements. Adjacent nodes are leaf nodes or intermediate-level nodes that are adjacent to one another in the input span. The parser applies the syntax rules to generate intermediate-level nodes linked to one, two, or occasionally more existing nodes. Assuming that the parse is successful, eventually the parser will generate a single node for a complete syntax parse tree that encompasses an entire sentence (i.e., include one leaf node for each word of the input sentence).

A conventional parser attempts to apply syntax rules one-at-a-time to single nodes, to pairs of nodes, and, occasionally, to larger groups of nodes. If a syntax rule specifies that two certain types of nodes can be combined into a higher-level node and a pair of adjacent nodes match that specification, then the parser applies the rule to the adjacent nodes to create a higher-level node representing the syntactic construct of the rule.

A typical parser uses a node chart data structure to track the nodes that have been created. Each node is represented by a record that is stored in the node chart. A parser typically determines whether each syntax rule can be applied to the records currently in the node chart. If a rule succeeds, the parser creates a new record. Each record, thus, corresponds to a sub-tree that may potentially be part of the full-sentence syntax parse tree. When a record that encompasses all the words of the input sentence is promoted to the node chart, then the tree represented by the record is a full-sentence parse of the input sentence.

The parser can conduct an exhaustive search for all possible full-sentence syntax parse trees by continuously applying the rules until no additional rules can be applied. The parser can also use various heuristic or statistical approaches to guide the application of syntax rules so that the rules that are most likely to result in a full-sentence syntax parse tree are applied first. Using such approaches, after one or a few full-sentence syntax parse trees are generated, the parser typically can terminate the search because the syntax parse tree most likely to be chosen as best representing the input is probably one of the first generated syntax parse trees. If no full-sentence syntax parse trees are generated after a reasonable search, then a fitted parse can be achieved by combining the most promising sub-trees together into a single tree using a root node that is generated by the application of a special aggregation rule.

Although such parsers can theoretically generate all possible syntax parse trees for an input sentence, they have the serious drawback that the complexity of the generated intermediate parse trees grows exponentially with the length of the input sentence being parsed. This exponential growth can quickly exceed memory and response time constraints for a particular application program that uses the parser. When memory or response time constraints have been exceeded, and parsing is stopped, the parser may have failed to produce a parse tree that spans all of the words in the input sentence. In particular, the parser may have failed to parse certain portions of the input. Thus, the resulting parse tree is completely uninformative as to those portions that were not parsed.

In one parser, a process is used to determine the likelihood that a certain syntax rule, when applied to a partial parse of an input span, will produce a node that will be part of the correct parse for the input span. This approach is used to guide the search through the space of possible parses toward those constructions that have the highest likelihood of producing the best parse, by producing a goodness measure for each node produced. This parser implements a "pruning" process to reduce the parsing time of the conventional parser. By integrating the goodness measure concept into the conventional parser, this parser reduces the time needed to parse the sentence by performing a non-exhaustive parse.

In conventional parsers, the mechanism by which nodes are added to the node chart involves a candidate list. A new node is produced by the application of a syntax rule to the nodes already in the node chart and is placed on the candidate list. In the pruning parser, the newly created node is assigned a goodness measure as it is placed on the candidate list. When it is time to promote a new node to the node chart, the candidate list is searched for the node with the highest goodness measure. That node is promoted to the node chart and used, along with neighboring nodes and the syntax rules, to generate additional nodes for the candidate list.

Two basic problems are faced by any node chart parser: generating a complete parse tree quickly, and generating the correct parse. The first problem consists of the time and resource constraints any practical system must impose on the search for the correct parse. Any parser could simply generate all possible parses, then use a goodness measure to choose the best parse, but this approach, will consume an impractical amount of memory for the node chart and time for the parse. Thus, a non-exhaustive search of the space of possible parses for a sentence is needed, preferably one that creates as close to the minimum possible number of nodes as possible.

The other problem consists of actually generating and identifying the correct parse. Even given exhaustive parsing, there is no guaranteed way of identifying the correct parse.

With pruning of the search space (i.e., implementing shortcuts), most possible parses are never even generated. Conventional parsers guide the search generally in the direction of the correct parse, but by no means in all cases is the correct parse the first parse found. Due to time and resource constraints, parsing continues for only a limited number of nodes added to the node chart after the first parse is found. If the first parse is not the correct parse, there is no guarantee that the correct parse will be found within the limited amount of additional searching.

Therefore, there is a need for an improved natural language parser that searches the space of possible parses and maximizes the probability of finding the correct parse, and does so quickly by building as few nodes as possible.

SUMMARY OF THE INVENTION

The present invention satisfies the above-described needs by providing a method for making natural language parsers more accurate and efficient. A directed search template set is used to reduce the time required to produce an accurate and complete parse tree. The directed search template set is used to identify "problematic" input spans. A problematic input span is one which contains at least one word or phrase that can be constructed in alternative ways. For example, a problematic span may include three phrases, the middle phrase of which may be properly joinable (according to one or more syntax rules) to the first or to the last phrase. Because one construction is right and the other wrong, there exists a fifty percent chance of joining the wrong pair, thereby creating the wrong construction. Problematic input spans can reduce the efficiency of a natural language parser or can result in the production of an inaccurate parse tree. The directed search templates contain span constructions that are known to be problematic. Once a problematic span has been identified, the present invention generates alternative parses for the problematic portion of the input span. This on-the-fly alternative parse generation permits the parser to consider the alternatives early in the parse process, thus reducing the overall time needed to parse a problematic input span and increasing the accuracy of a non-exhaustive parse process.

In one aspect of the present invention, a method is provided for parsing a natural language input span. The method breaks the input span into words and associates parts of speech with each word in the input span, by looking the words up in a dictionary or lexicon. Each word and its associated part of speech are stored as a node in a candidate list and assigned a goodness measure. A leading candidate node from the candidate list is determined and is promoted to a node chart. The leading candidate node is also compared to a directed search template. If a match is found between the leading candidate node and the template, an alternative node is generated and added to the candidate list. By repeating the steps of this method, the natural language input span is completely parsed.

In another aspect of the present invention, a method is provided for improved natural language parsing. An input span is broken into words and each word is associated with a part of speech. A leaf node is created for each word and part of speech combination. Leaf nodes are combined to form intermediate-level nodes. Intermediate-level nodes are compared to a template. If a match is found between an intermediate-level node and the template, an alternative node is created. By repeating the steps of this method, the input span is completely parsed.

In yet another aspect of the present invention, a method is provided for increasing the efficiency of a natural language parser used for parsing input spans. Each of a plurality of intermediate-level nodes are compared to a template. If a match is found between one of the intermediate-level nodes and the template, an alternative node is generated. By repeating the steps of this method, the input span is completely parsed.

The various aspects of the present invention may be more clearly understood and appreciated from a review of the following detailed description of the disclosed embodiments and by reference to the drawings and claims.

BRIEF DESCRIPTION OF THE DRAWINGS

FIG. 2c is a block diagram illustrating the interaction between the major components employed by a conventional natural language parser.

FIGS. 4a–4c are block diagrams illustrating the operation of a conventional natural language parser.

DETAILED DESCRIPTION

In an exemplary embodiment of the present invention, an improved natural language parser is provided for accepting as input a span of natural language text and providing as output a parse tree. When the parser successfully parses an input span, the parse tree represents the words of the input span in a format that permits a grammatical critique of the sentence. For example, a complete parse tree may identify the correct part of speech of each word in the span and may identify a sentence construction for the span. The sentence construction represented by the parse may indicate the syntactic relationship of words or phrases in the span to other words or phrases in the span. For example, the sentence construction may identify an adjective phrase that modifies a word that is identified as a noun.

An exhaustive parse of a span will typically result in the creation of at least one parse tree that accurately represents the input span. However, an exhaustive parse is usually unavailable, because system resource or time consumption constraints are prohibitive of an exhaustive parse. Therefore, shortcuts are typically implemented to provide an accurate and yet efficient parse of an input span.

In one embodiment of the present invention, a directed search template set is used to reduce the time required to produce an accurate and complete parse tree. The directed search template set is used to identify "problematic" input spans. A problematic input span is one which contains at least one word or phrase that can be interpreted in alternative ways. Problematic input spans can reduce the efficiency of a natural language parser or can result in the production of an inaccurate parse tree. The directed search templates contain word or phrase combinations that are known to be problematic and their alternative combinations. Once a problematic span has been identified, an exemplary embodiment of the present invention generates alternative parses for the problematic portion of the input span. This on-the-fly alternative parse generation permits the parser to consider the alternatives early in the parse process, thus reducing the overall time needed to parse a problematic input span.

An Exemplary Operating Environment

Figure 1:
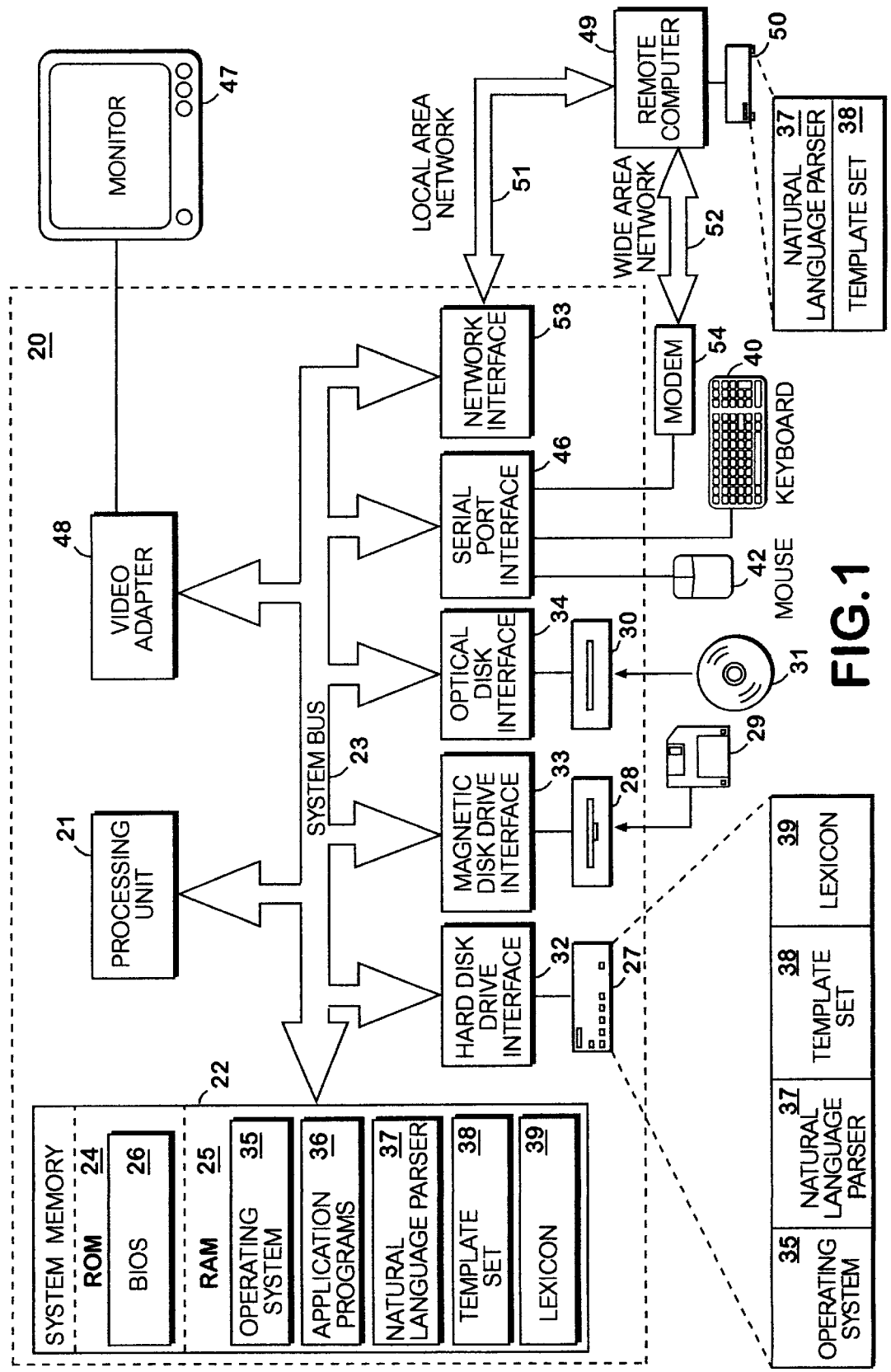
FIG. 1 is a block diagram of a personal computer that provides the operating environment for an embodiment of the present invention.

FIG. 1 and the following discussion are intended to provide a brief, general description of a suitable computing environment in which the invention may be implemented. Although the present invention is described as a stand-alone process, those skilled in the art will recognize that the invention may be implemented in combination with other program modules or as a part of a larger program module. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, a natural language parser 37, a directed search template set 38, and a lexicon 39. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

A Natural Language Parser

As mentioned above, a natural language parser is a program that takes a span (e.g., a sentence) of natural language text as input and produces as output for that input span a data structure, usually called a parse tree. A parse tree typically represents the syntactic relationships between the words and phrases in the input span.

Natural language parsers have traditionally been rule-based. Such rule-based parsers store knowledge about the syntactic structure of a natural language in the form of syntax rules, and apply these rules to the input span to obtain the resulting parse tree. The parser usually stores information about individual words, such as the parts-of-speech each word can represent, in a dictionary or "lexicon." The lexicon may be accessed by the parser for each word in the input span, prior to applying the syntax rules. For the purposes of the following discussion, TABLE 1, below, sets forth abbreviations used to represent phrases and TABLE 2 sets forth parts-of-speech in an exemplary lexicon.

TABLE 1

| Phrase | Abbreviation |
| --- | --- |
| Noun Phrase | NP |
| Verb Phrase | VP |
| Adjective Phrase | AJP |
| Adverb Phrase | AVP |
| Preposition Phrase | PP |
| Complement Clause | COMPCL |

TABLE 2

| Part of Speech | Abbreviation |
| --- | --- |
| Noun | N |
| Verb | V |
| Adjective | ADJ |
| Adverb | ADV |
| Preposition | P |
| Conjunction | CONJ |

Many parsers apply rules in a "bottom-up" manner. To generate a parse tree, a bottom-up parser first creates one or more leaf nodes for each word of the input span. Each leaf node indicates a possible part of speech of the word. For example, the word "part" can be used as a noun or a verb part-of-speech. A leaf node is created for the word "part" as a noun, and another leaf node is created for the word "part" as a verb. The parser then applies the syntax rules to generate intermediate-level nodes linked to one, two, or occasionally more existing nodes. Assuming that the parse is successful, the parser will ultimately generate a single node for a complete syntax parse tree that encompasses the entire span (i.e., one leaf node for each word of the input span).

As mentioned, a parser attempts to apply syntax rules one-at-a-time to single nodes, to pairs of nodes, and, occasionally, to larger groups of nodes. If a syntax rule specifies that two certain types of nodes can be combined into a higher-level node and a pair of adjacent nodes match that specification, then the parser applies the rule to the adjacent nodes and creates a higher-level node representing the syntactic construct of the rule.

Conventional syntax rules comprise a specification and a condition (which is optional). The specification indicates that certain types of syntactic constructs can be combined to form a new syntactic construct (e.g., "VP=NP+VP"). The conditions, if any, specify criteria that need to be satisfied before the rule can succeed (e.g., plural agreement of the NP and the VP). For example, the words "he see" represent an NP and a VP, respectively. These words will satisfy the specification of the syntax rule given above and can be potentially combined into the higher-level syntactic construct of a VP. The specification of "VP=NP+VP" indicates that an intermediate-level VP node linked to the two nodes representing "he" and "see" can be created (i.e., he see (VP)=he (NP)+see (VP)).

However, the syntax rule may have a condition which indicates that the NP and VP need to be in agreement as to number (singular or plural). In this example, "he" is singular and "see" is plural. Therefore, "he" and "see" are not in plural agreement and the syntax rule does not succeed. If a syntax rule succeeds, a new node is created and becomes part of the total set of nodes to which the syntax rules are applied. The process of applying syntax rules to the growing set of nodes continues until a full-sentence syntax parse tree is generated. A full-sentence syntax parse tree includes all of the words of the input as nodes and represents one possible parse of the input.

Figure 2A:
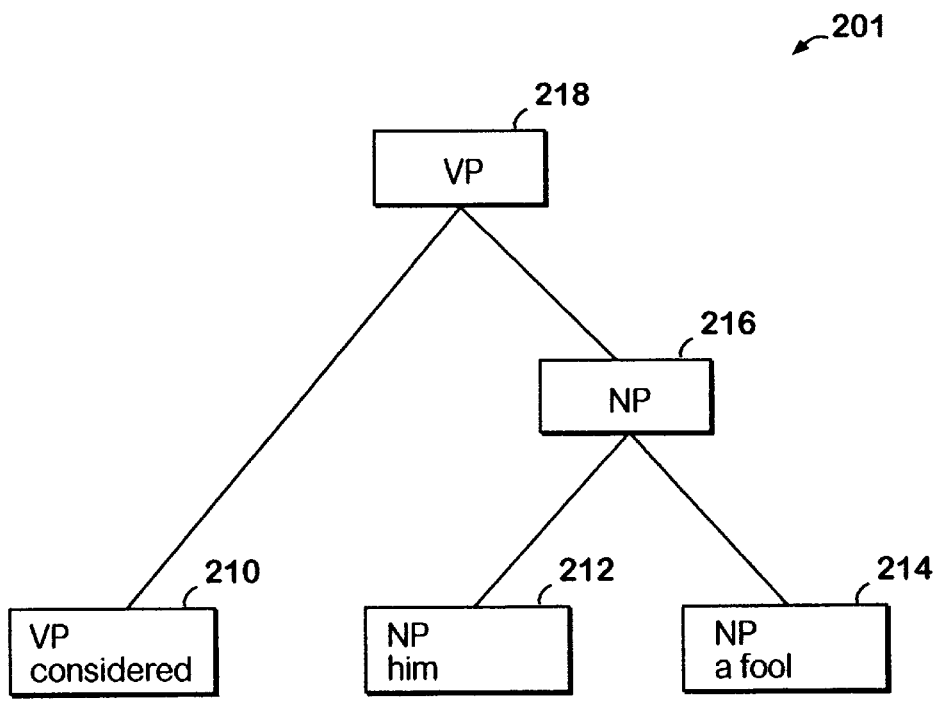
FIG. 2a is a block diagram of an exemplary parse tree.

Referring now to FIG. 2a, a block diagram depicts a partial parse tree 201 of the input span: "They considered him a fool." The first node 210 contains the word "considered" and its part of speech, VP. The second node 212 contains the word "him" and its part of speech, NP. The third node 214 contains the words "a" and "fool" and their collective part of speech, NP. In this parse tree 201, the second node 212 and the third node 214 have been joined, by virtue of having satisfied a syntax rule, to form a fourth node 216. The fourth node 216, thus contains the words "him", "a", and "fool" and their collective part of speech, NP. Similarly, fourth node 216 and first node 210 have been joined (by satisfying a syntax rule) and form a fifth node 218. The fifth node 218, thus contains the words "considered", "him", "a", and "fool" and their collective part of speech, VP.

Figure 2B:
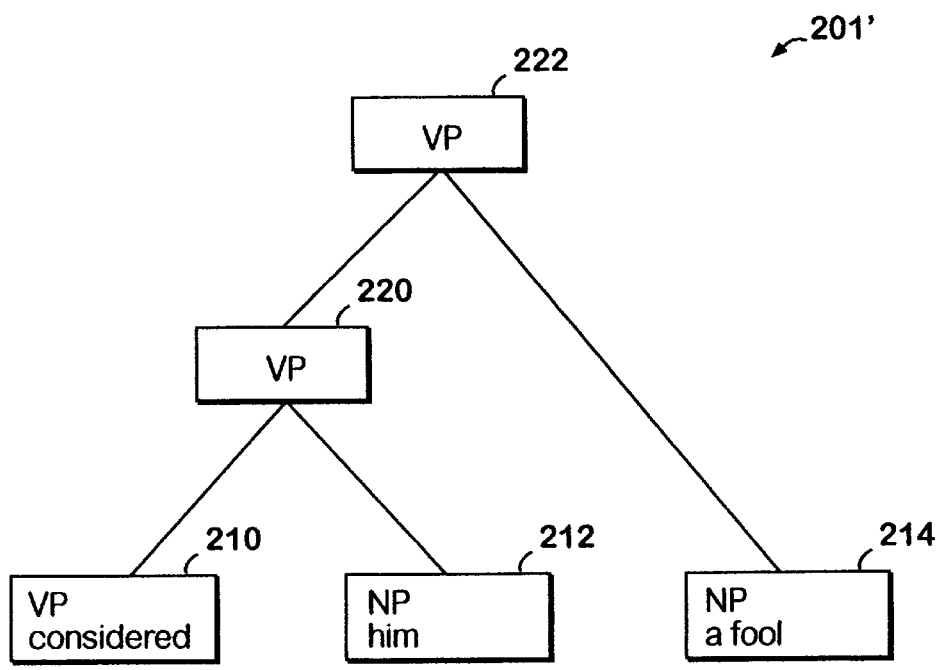
FIG. 2b is a block diagram of an exemplary alternative parse tree.

Unfortunately, given the input span, the parse tree of FIG. 2a is incorrect. The correct parse tree 201' is shown in FIG. 2b. The first node 210, second node 212, third node 214 are the same as those shown in FIG. 2a. However, the nodes connecting these nodes are different. A sixth node 220 joins the first node 210 and the second node 212. A seventh node 222 joins the sixth node 220 and the third node 214. The improved parser of an exemplary embodiment of the present invention will identify the combination of nodes that leads to an increased likelihood of an incorrect parse. That is, nodes 210, 212, and 214 are identifiable as a problematic combination of nodes.

Referring now to FIG. 2c, a conventional parser 200 is depicted in block diagram form. A candidate list 208 is shown with leaf nodes representing each of the words of the input span 202 as well as the parts of speech associated with each word. The associated parts of speech are determined by looking the words up in a dictionary or lexicon (not shown). Other nodes are created by applying syntax rules (not shown) to the existing nodes. The conventional parser 200 uses a chart data structure called a node chart 204 to track the nodes 206a–206h that have been created during the parse process. As the parse process proceeds, nodes are "promoted" from the candidate list 208 to the node chart 204. Each promoted node 206a–206h is represented by a record stored in the node chart 204. In this example, the leaf nodes are shown in their initial state in the candidate list 208, despite the fact that they have been moved to the node chart 204.

Generally, the parser 200 determines which nodes are to be promoted to the node chart 204 by evaluating the nodes in the candidate list 208. As each new node is generated by the application of a syntax rule to existing nodes 206a–206n, the new node is placed on the candidate list 208. Each node in the candidate list 208 is associated with a goodness measure which represents the probability that the particular node will be a component of the completed parse tree. When it is time to promote a new node to the node chart, the candidate list is searched for the node with the highest goodness measure. That node is promoted to the node chart and used, along with neighboring nodes and the syntax rules, to create additional nodes for the candidate list 208.

The parser 200 typically determines whether each of a set of syntax rules can be applied to the nodes 206a–206n currently in the node chart 204. If the rule can be applied, then the parser 200 applies the condition of the syntax rule to the components of the nodes 206a–206n affected the syntax rule. If the syntax rule conditions are satisfied, then the rule succeeds and the parser creates a new node and stores it in the candidate list 208 with the existing nodes 206a–206n. Each node 206a–206n, thus, contains a sub-parse-tree that may ultimately be determined to be part of the full input span 202 parse tree. When a node that encompasses all the words of the input span 202 is promoted to the node chart 204, then the parse tree represented by the all-encompassing node is a complete parse of the input span 202.

The parser can conduct an exhaustive search for all possible full-sentence syntax parse trees by continuously applying the rules until no additional rules can be applied. The parser can also use various heuristic or statistical approaches to guide the application of syntax rules so that the rules that are most likely to result in a full-sentence syntax parse tree are applied first. Using such approaches, after one or a few full-sentence syntax parse trees are generated, the parser typically can terminate the search because the syntax parse tree most likely to be chosen as best representing the input is probably one of the first generated syntax parse trees. If no full-sentence syntax parse trees are generated after a reasonable search, then a fitted parse can be achieved by combining the most promising sub-trees together into a single tree using a root node that is generated by the application of a special aggregation rule.

Various means of stopping the parsing process will support the implementation of an exemplary embodiment of the present invention. Thus, for the purposes of this description, the stopping means will be referred to as an "end of parse condition." The end of parse condition may be the creation of the first full span parse, the creation of every possible full span parse, or the consumption of a predefined level of system resources or time.

A Conventional Method for Parsing Natural Language

Figure 3:
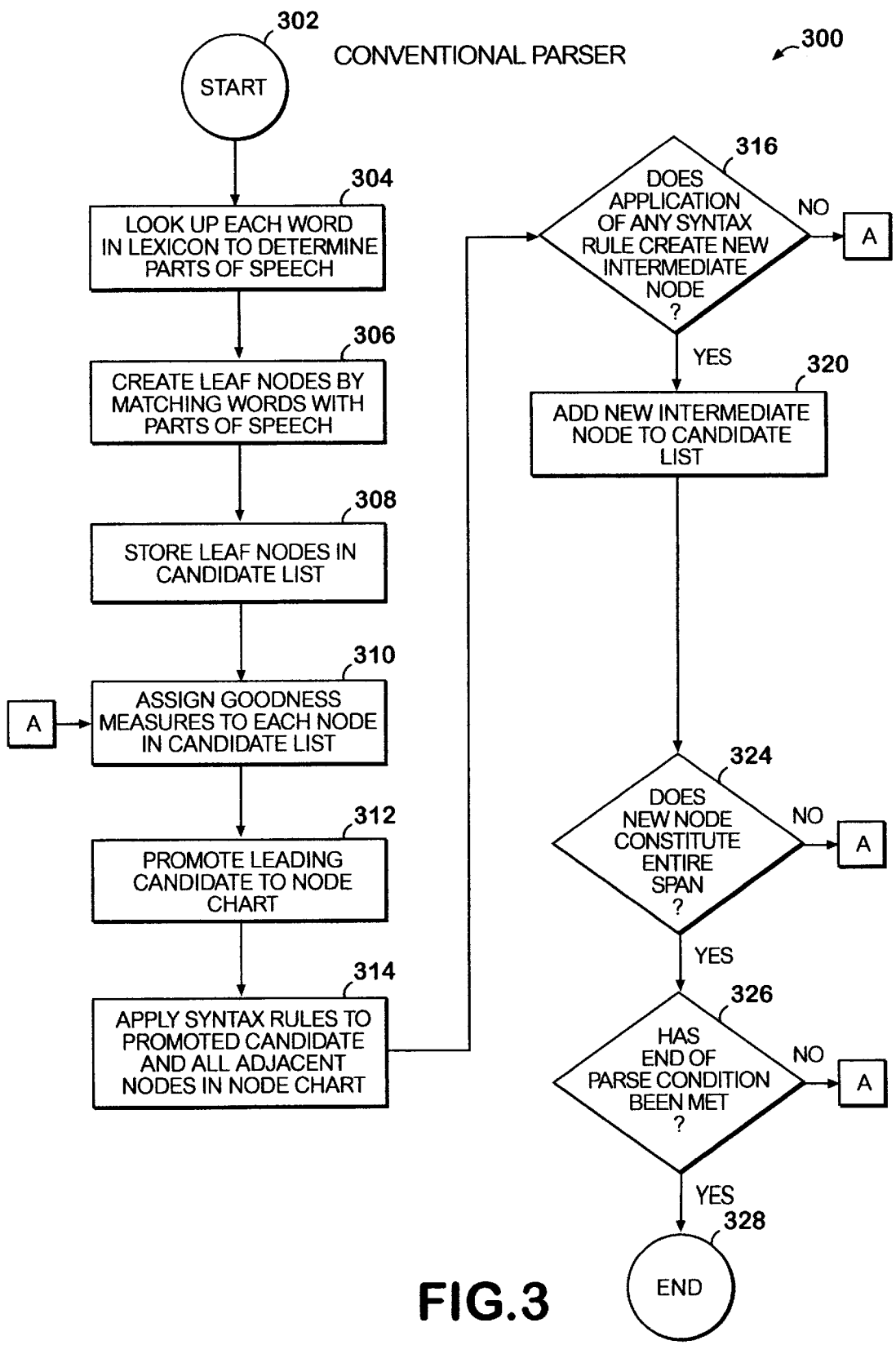
FIG. 3 is a flowchart illustrating the method of operation of a conventional natural language parser.

FIG. 3 depicts an exemplary method of a conventional natural language parser. This method provides steps for manipulating an input span as described in connection with FIG. 2. Specifically, the steps of this method utilize the data structures of the candidate list and node chart to generate a parse tree from the input span.

Referring now to FIG. 3, the method 300 starts at step 302 and proceeds to step 304. At step 304, the parser looks up each word in a lexicon to determine the part of speech associated with each word. As discussed in connection with FIG. 2, the lexicon typically contains the parts-of-speech for which each word in the natural language can be used. Therefore, when a word is looked up in the lexicon, more than one result may be returned (e.g., a verb and a noun use of the word).

The method then proceeds to step 306. At step 306, leaf nodes are created by matching the words with the associated parts-of-speech. Specifically, for each word and part of speech pair returned by step 304, a leaf node is created. Referring back to FIG. 2c, the candidate list 208 contains eight leaf nodes, although the input span only comprises five words. This is because more than one leaf node is created for some of the words.

Referring again to FIG. 3, the method proceeds to step 308 and the leaf nodes are stored in the candidate list as depicted in FIG. 2c. The method then proceeds to step 310 and a goodness measure is assigned to each of the nodes in the candidate list. As discussed in connection with FIG. 2, the goodness measure represents the probability that the particular node will be a component of the completed parse tree. It will be appreciated that various means of calculating a goodness measure are contemplated by the inventor. One means of calculating a goodness measure is described in a co-pending U.S. patent application Ser. No. 08/896,557, entitled "Method and System for Natural Language Parsing Using Chunking," filed on Jul. 17, 1997, now abandoned, and assigned to Microsoft Corporation. This U.S. patent application is incorporated herein by reference. For the purposes of this discussion, it is sufficient to assume that the goodness measure identifies nodes that are likely components of the accurately parsed input span.

The method next proceeds to step 312 and the leading candidate in the candidate list is promoted to the node chart. The leading candidate is the node in the candidate list with the highest goodness measure, at any given time. Thus, the node that is the most likely of the nodes in the candidate list to be a component of the completed parse tree is promoted to the node chart.

The method then proceeds to step 314 and the syntax rules are applied to the promoted node and all adjacent nodes in the node chart. Specifically, the promoted node is compared to the specification portion of the syntax rules until a match is found. When a match is found, then the other nodes in the node chart are compared to the specification until a match is found. When all of the specifications of a particular syntax rule are met, then the syntax rule is "triggered."

A triggered syntax rule will change one node into another node or combine adjacent nodes into a single node if all of the syntax rule's conditions (if any) are met. Adjacent nodes are those nodes that are adjacent to one another in the span. When nodes are combined to create a new node, the new nodes are referred to as intermediate-level or higher-level nodes. At decision block 316, a determination is made as to whether the application of any syntax rule has created a new intermediate-level node. If no new node has been created, then the method branches back to step 310 (via connector A) and assigns goodness measures to each node in the candidate list. Of course, if all of the nodes in the candidate list have already been assigned goodness measures, then this step may be skipped. If, at decision block 316, a determination is made that a new intermediate-level node has been created, then the method branches to step 320 and the new intermediate-level node is added to the candidate list.

The method then proceeds to decision block 324 at which a decision is made as to whether the new node constitutes the entire span. If the new node constitutes the entire span, then it represents a possible complete parse and the method branches to decision block 326. At decision block 326 a determination is made as to whether the end of parse condition has been met. As discussed in connection with FIG. 2, the end of parse condition may be any means of determining the end-point of the parsing process. For example, the parser may be configured to stop parsing the span when the first complete parse tree is generated. If the end of parse condition has been met, then the method ends at step 328.

Returning to decision block 324, when the new node does not constitute an entire span, then the method branches to step 310 (via connector A) and the nodes in the candidate list are assigned goodness measures in order to determine the next leading candidate. Likewise, at decision block 326, when the end of parse condition has not been met, the method will branch to step 310 (via connector A) despite the creation of a full-span parse tree.

The above method will generate a full-span parse and will generate all possible parses of a span if the end of parse condition is so permissive. However, the above described method may also generate incorrect parses. Often, these incorrect parses will be generated before the correct parse tree is generated. Moreover, the correct parse trees may never be generated prior to the satisfaction of the end of parse condition. In such a case, the output of the natural language parser will be an inaccurate parse tree. By identifying problematic intermediate-level and higher-level nodes, an exemplary embodiment of the present invention provides a means for making the parse process more efficient and accurate.

Figure 4B:
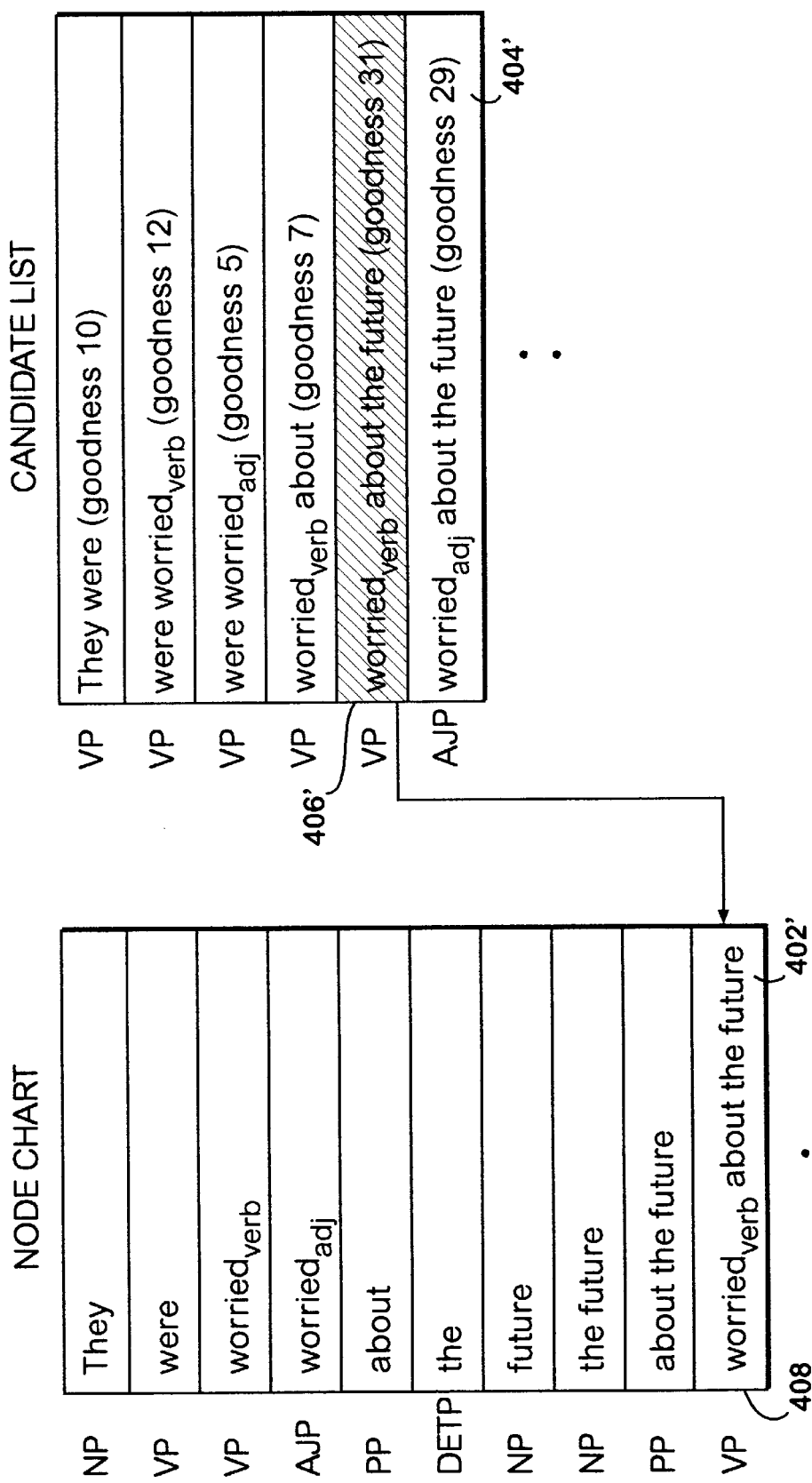

Referring now to FIGS. 4a–4d an example is provide that illustrates a common problem experienced by users ( conventional parsers. In this example, the input span is "They were worried about the future." FIG. 4a shows the node chart 402 and the candidate list 404 of the conventional parser, as they would look early in the process of parsing the input span. The part of speech associate with the word "worried" is shown in subscript, for simplicity of discussion. The VP "worried$_{verb}$ about the future" 406 (an intermediate-level node) has been created is shown in the candidate list 404.

Because the VP "worried$_{verb}$ about the future" 406 has the highest goodness measure in the candidate list 404, it will be moved to the node chart 402, as shown in FIG. 4b. The position in the candidate list 404' that contained the VP "worried$_{verb}$ about the future" 406' is shaded to indicate that the VP "worried$_{verb}$ about the future" 406 no longer occupies the position. Instead, it occupies a newly created position 408 in the node chart 402.

Figure 4C:
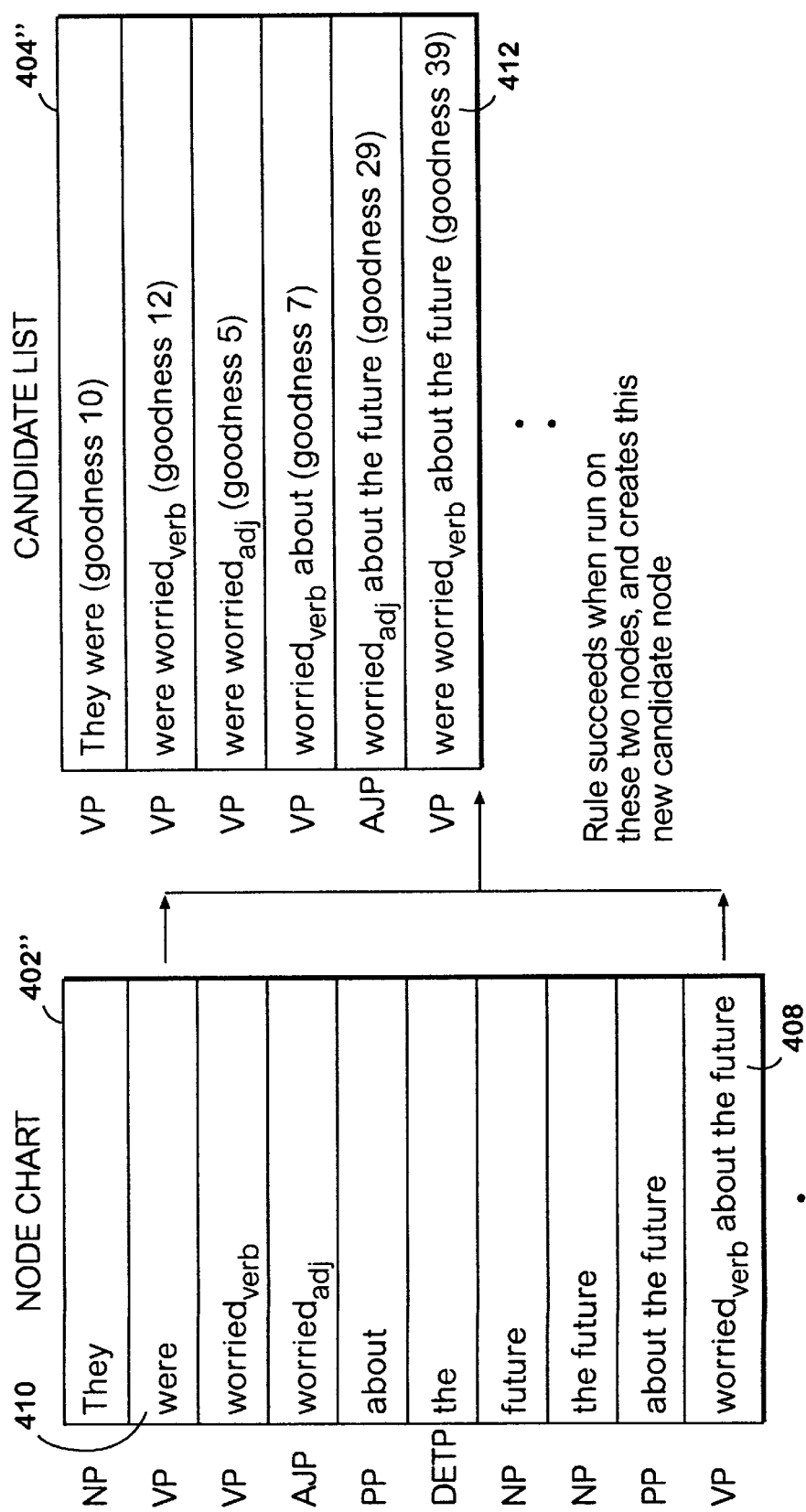

As discussed above, the promotion of the VP "worried$_{verb}$ about the future" 406 is followed by an application of the parser's syntax rules. The results of the application of syntax rules to the nodes in this example are depicted in FIG. 4c. Because the VP "worried$_{verb}$ about the future" 408 and the VP "were" 410 trigger a syntax rule and the syntax rule succeeds, the nodes are combined to form a new intermediate-level node, the VP "were worried$_{verb}$ about the future" 412. The VP "were worried$_{verb}$ about the future" 412 is placed in the candidate list 404".

Unfortunately, "were worried$_{adj}$ about the future" is the desired construction for this input span. Because that desired construction has not been built at this stage of the parse, it cannot be directly evaluated at this point for the purposes of guiding the parse. If the desired construction ("were worried$_{adj}$ about the future") had been created, then it would have a higher goodness measure that the less favorable construction ("were worried$_{verb}$ about the future") and the parse would be appropriately directed. Instead, the VP "were worried$_{verb}$ about the future" 412 has the highest goodness measure of the nodes that have been built and placed in the candidate list 404", so it will be the next node moved to the node chart 402". This misstep will likely lead to a full-sentence parse with the wrong construction or a prolonged parse process.

A Directed Search Parser

By using directed search templates, an exemplary embodiment of the present invention will avoid the misstep described above. Briefly stated, a directed search template is a description of a cluster of problematic segments; each segment representing a potential alternative construction of the other segments in the cluster. For example, the problem cluster for a VP node consisting of a VP-AVP-PP segment of constituents might have two entries, one for the VP-AVP-PP construction and another for a VP-AJP-PP construction. In this case, the VP-AJP-PP construction would be an alternative construction from which an alternative node could be created. The alternative construction might identify parses in which a node can be properly represented by different part-of-speech phrases (e.g., an AJP rather than an AVP). Similarly, an input span might be equally representable by two, distinct parse tree structures, as depicted in FIGS. 2a and 2b. Thus, the alternative constructions are equivalents, in that an input span can be parsed to fit either construction. Of course, a directed search template may contain any number of equivalent alternative constructions. FIGS. 5a–5d illustrate how a directed search parser that is an exemplary embodiment of the present invention utilizes the directed search templates to redirect a parse process at the point at which the above-described misstep occurs.

Figure 5A:
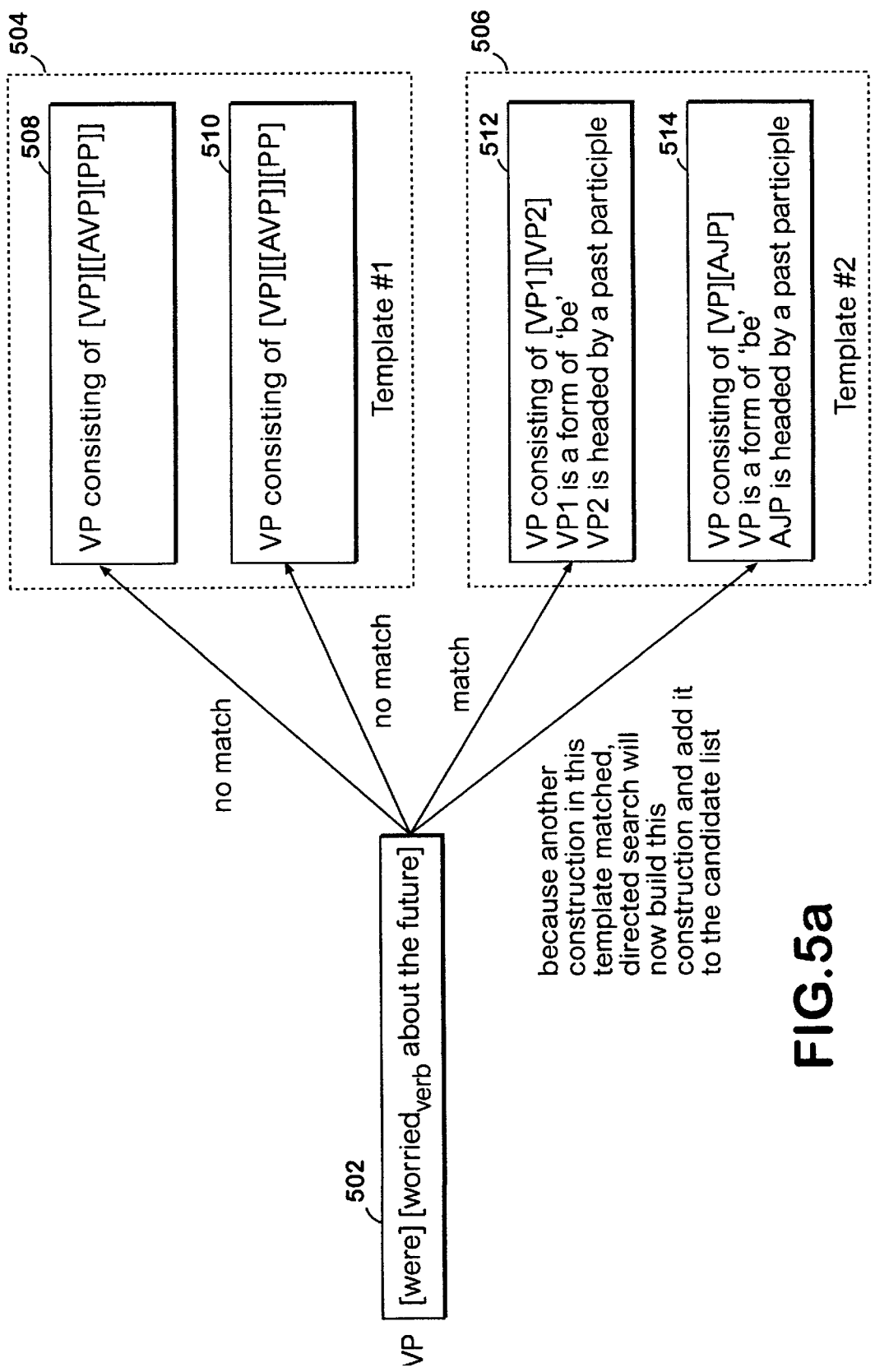
FIGS. 5a–5d are block diagrams illustrating the operation of an embodiment of the present invention.

Referring now to FIG. 5a, the intermediate-level node VP "were worried$_{verb}$ about the future" 502 is shown in its state just prior to being promoted to the node chart (not shown). At this stage of the parse process, the exemplary directed search parser compares the intermediate-level node VP "were worried$_{verb}$ about the future" 502 to the directed search templates. As shown the intermediate-level node VP "were worried$_{verb}$ about the future" 502 consists of a VP-VP construction.

Template 1 504 and Template 2 506 contain clusters of VP segments. Template 1 504 contains a VP-AVP-PP segment and another VP-AVP-PP segment. Neither of these segments match the intermediate-level node VP "were worried$_{verb}$ about the future" 502, which comprises a VP-VP construction. Template 2 506, however, contains a VP-VP construction matching the construction of the intermediate-level node VP "were worried$_{verb}$ about the future" 502. Thus, the other segments in the Template 2 504 cluster will be used as models for building alternative constructions (and ultimately alternative nodes) for the intermediate-level node VP "were worried$_{verb}$ about the future" 502, which has been identified as problematic, by virtue of matching a segment in a template.

In this example, the other segment in the Template 2 504 cluster is the VP-AJP segment 514. The VP-AJP segment 514 comprises constituents VP and AJP. The constituent VP must be a form of "be" to match. The constituent AJP must be headed by a past participle. Thus, to create the alternative node, the AJP form of the past participle phrase must be provided. The directed search parser will search for the AJP form of the past participle phrase in the candidate list (not shown).

Figure 5B:
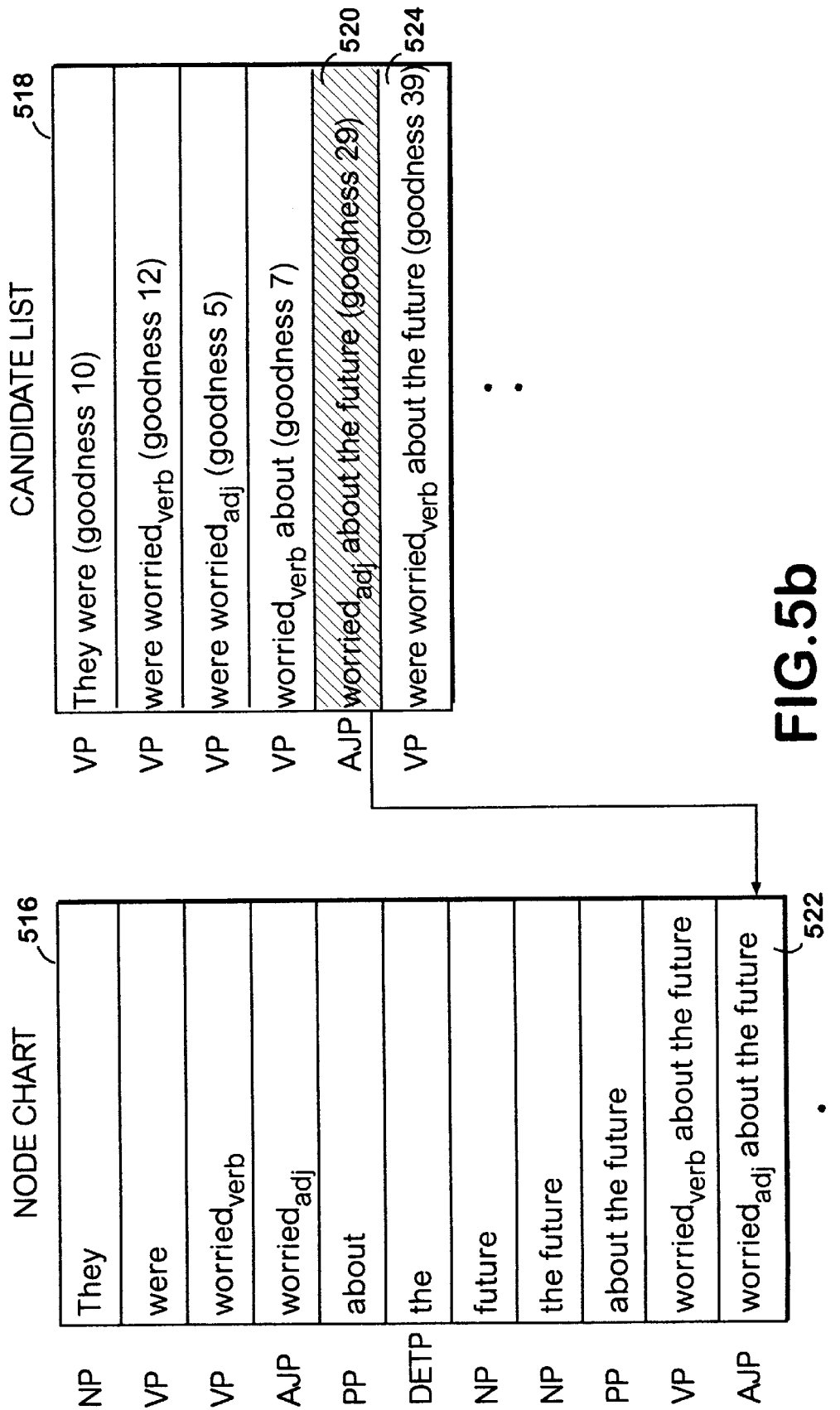

Referring now to FIG. 5b, the node chart 516 and candidate list 518 are depicted. Because the AJP "worried, about the future" is already in the candidate list at position 520, the directed search parser moves it to position 522 in the node chart 516 in order to construct the alternative node. If the AJP "worried$_{adj}$ about the future" had not already been in the candidate list 518, the directed search parser would have searched the candidate list for "worried$_{adj}$" and for the PP "about the future" and then added both to the candidate list. Notably, the AJP "worried$_{adj}$ about the future" was moved to the node chart 516 despite the fact that it had a lower goodness measure than the node at position 524. This unconventional promotion was made, because the directed search parse interrupts the normal parsing process to assure that all alternative nodes are created. Thus, a comparison can be made between the goodness measures of the newly created alternative constructions and that of the former leading candidate node (the problematic construction), to determine a new leading candidate to promote to the node chart 516.

Figure 5C:
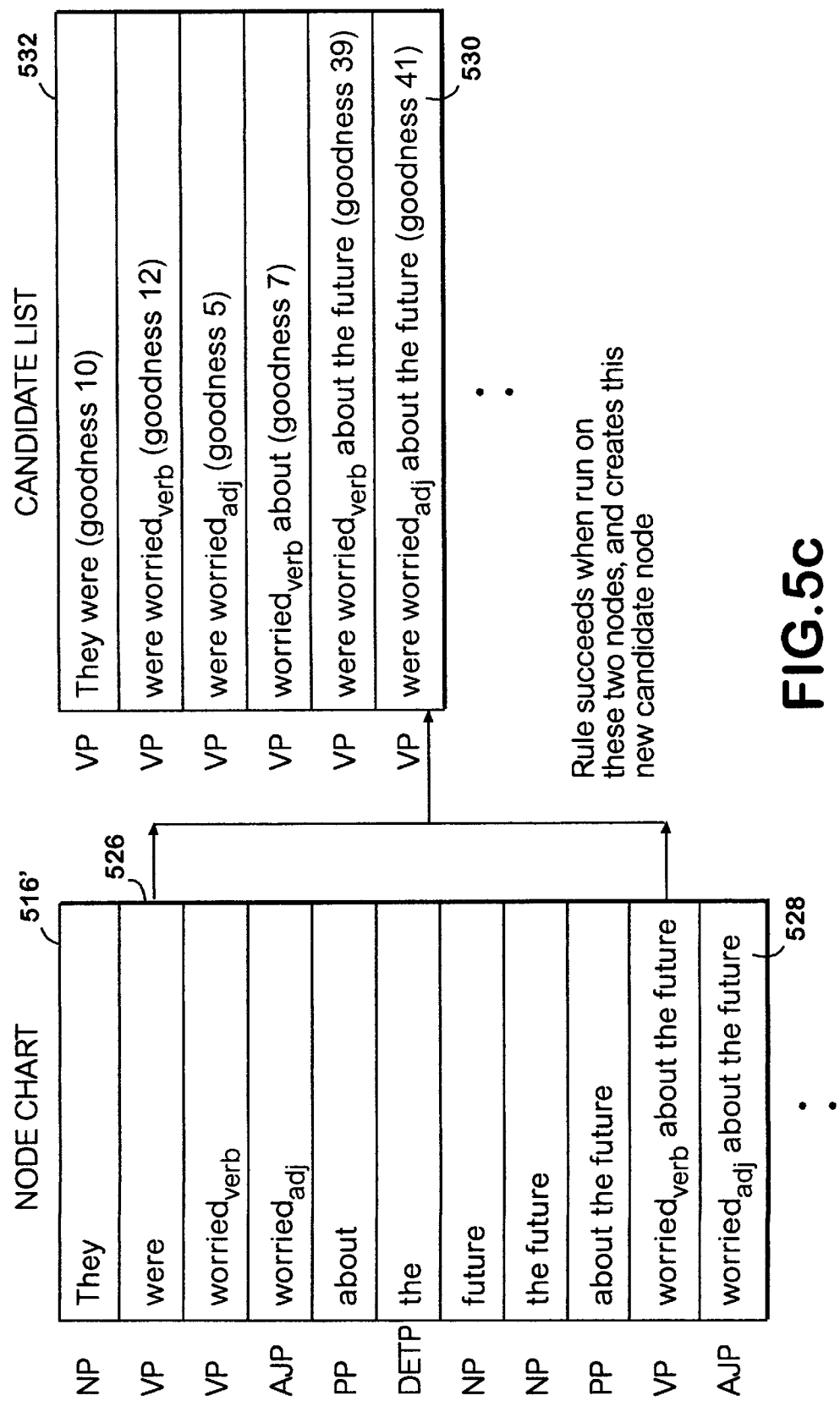

Referring now to FIG. 5c, a syntax rule applies to the nodes at position 526 and position 528 (the promoted node) of the node chart 516'. Thus, a new node, the intermediate-level node VP "were worried$_{adj}$ about the future" 530, is created and added to the candidate list 532. Because the VP "were worried$_{adj}$ about the future" 530 is the correct construction for the input span, it has the highest goodness measure of the nodes in the candidate list 532. In an alternative embodiment, a specialized goodness measure may be calculated for the nodes in the candidate list that were created as alternative nodes by the directed search parser.

Figure 5D:
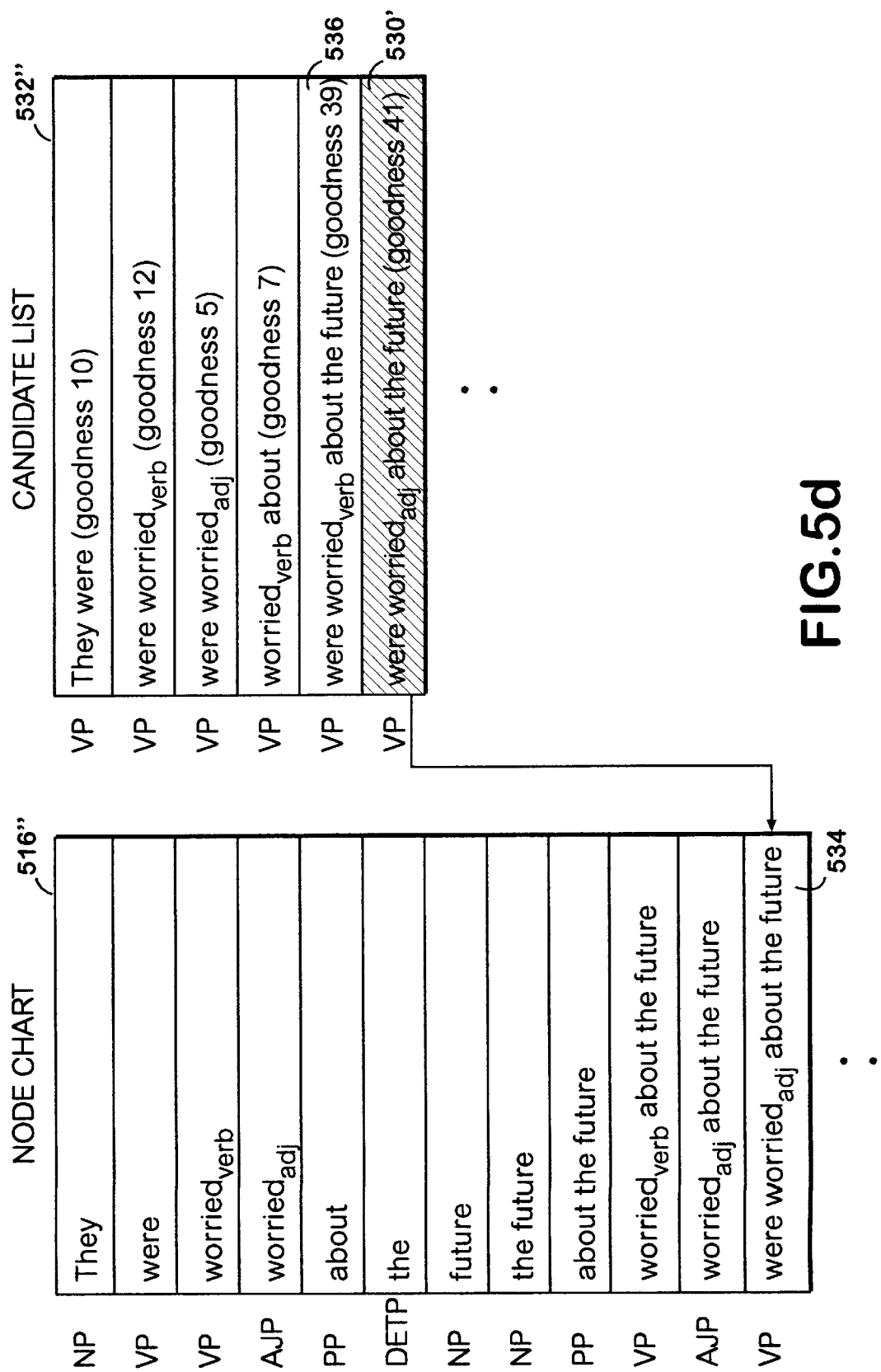

In FIG. 5d, the node at position 530' is promoted from the candidate list 532' to the node chart 516" and occupies position 534 in the node chart. In contrast, the conventional parser would have promoted the intermediate-level node VP "were worried$_{verb}$ about the future" 536 to the node chart 516" and would have lead to the wrong full sentence parse when the next syntax rule was triggered.

Figure 6:
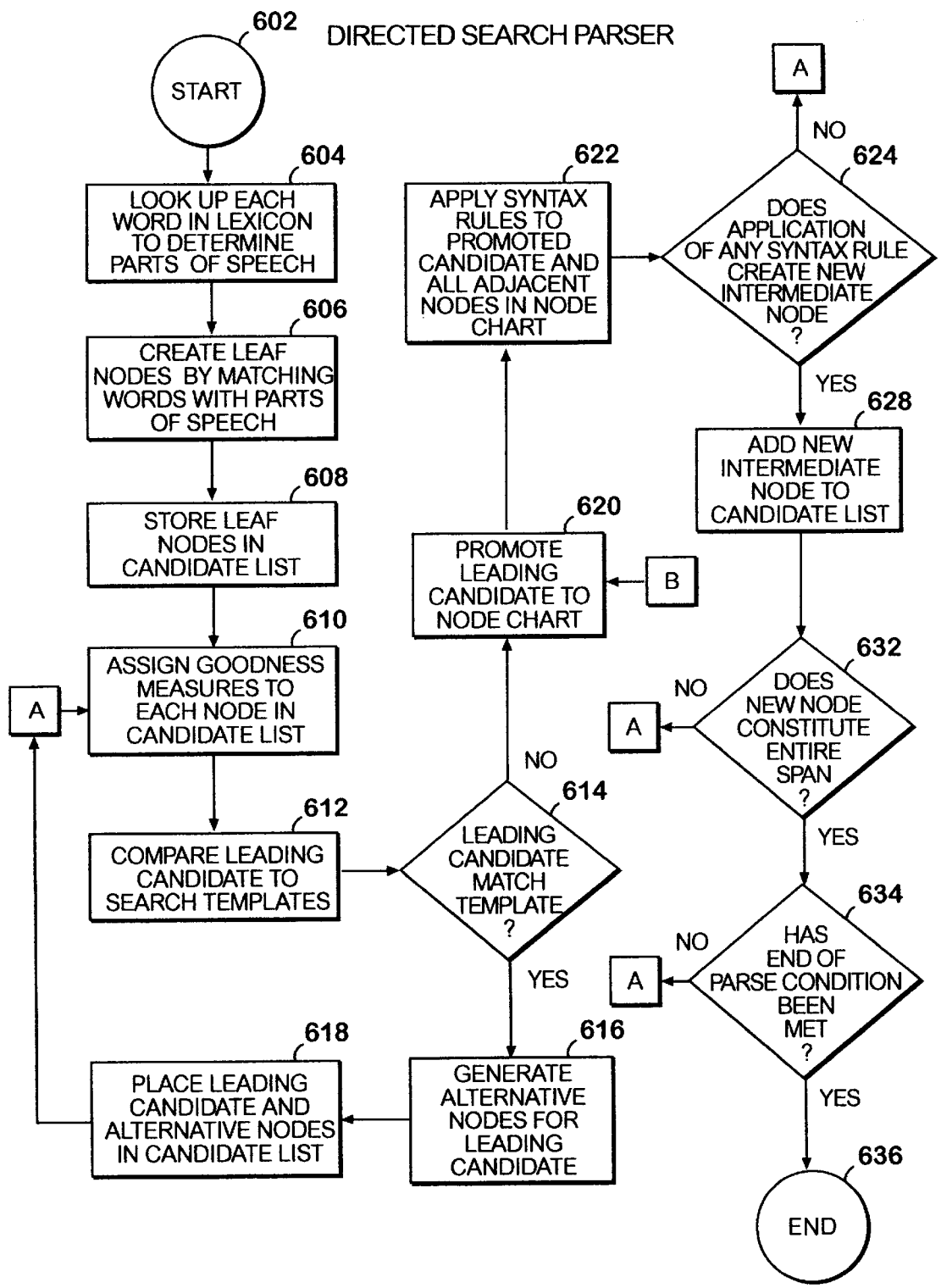
FIG. 6 is a flowchart illustrating the method of operation of an embodiment of the present invention.

FIG. 6 depicts the method of an exemplary embodiment of the present invention. Like the method described in connection with FIG. 3, this method utilizes the data structures of the candidate list and node chart to generate a parse tree from the input span. However, the method of FIG. 6 includes steps for providing the directed search capabilities described in connection with FIGS. 5a–5d.

Referring now to FIG. 6, the method 600 starts at step 602 and proceeds to step 604. At step 604, the parser looks up each word in the lexicon to determine the part of speech associated with each word. As discussed in connection with FIG. 3, the lexicon typically contains the parts-of-speech for which each word in the natural language can be used. Therefore, when a word is looked up in the lexicon, more than one result may be returned and more than one leaf node may be created for any given word.

The method then proceeds to step 606, wherein leaf nodes are created by matching the words with the associated parts-of-speech. Specifically, for each word and part of speech pair returned by step 604, a leaf node is created. The method then proceeds to step 608 and the leaf nodes are stored in the candidate list as depicted in FIGS. 2c and 5a–5d. The method then proceeds to step 610 and a goodness measure is assigned to each of the nodes in the candidate list. As discussed in connection with FIGS. 2 and 3, the goodness measure represents the probability that a particular node will be a component of the completed parse tree.

The method next proceeds to step 612 and the leading candidate in the candidate list is compared to the search templates. The method proceeds to decision block 614, where a determination is made as to whether there is a match between the leading candidate and a search template. If there is a match, then the leading candidate is a problematic node and the method branches to step 616 and generates alternative nodes for the leading candidate.

The alternative nodes generated at step 616 represent constructions that are acceptable alternatives to the problematic leading candidate. The method then proceeds to step 618 and places the leading candidate and the alternative nodes in the candidate list. When all of the newly created alternative nodes have been placed in the candidate list, the method proceeds to step 610 and assigns a goodness measure to each node in the candidate list. Of course, in an alternative embodiment, only those nodes that have not already been assigned a goodness measure will be assigned a goodness measure at this second (or subsequent) implementation of step 610.

Returning now to decision block 614; when the leading candidate does not match any of the templates (i.e., it is not problematic), the method need not apply the directed search templates and branches to step 620. The method following this point is similar to that of the conventional parser. At step 620, the leading candidate is promoted to the node chart.

The method then proceeds to step 622 and the syntax rules are applied to the promoted node and all adjacent nodes in the node chart. Specifically, the promoted node is compared to the specification portion of the syntax rules until a match is found. When a match is found, then the other nodes in the node chart are compared to the specification until a match is found. When all of the specifications of a particular syntax rule are met, then the syntax rule is "triggered."

A triggered syntax rule will combine adjacent nodes into a single node if all of the syntax rule's conditions (if any) are met. When nodes are combined to create a new node, the new nodes are referred to as intermediate-level or higher-level nodes. At decision block 624, a determination is made as to whether the application of any syntax rule has created a new intermediate-level node. If no new node has been created, then the method branches back to step 610 (via connector A) and assigns goodness measures to each node in the candidate list. Of course, if all of the nodes in the candidate list have already been assigned goodness measures, then this step may be skipped. If, at decision block 624, a determination is made that a new intermediate-level node has been created, then the method branches to step 628 and the new intermediate-level node is added to the candidate list.

The method then proceeds to decision block 632 at which a decision is made as to whether the new node constitutes the entire input span. If the node constitutes the entire span, then it represents a possible complete parse and the method branches to decision block 634. At decision block 634 a determination is made as to whether the end of parse condition has been met. As discussed in connection with FIGS. 2 and 3, the end of parse condition may be any means of determining the end-point of the parsing process. If the end of parse condition has been met, then the method ends at step 636.

Returning to decision block 632, when the new node does not constitute an entire span, then the method branches to step 610 (via connector A) and the nodes in the candidate list are assigned goodness measures in order to determine the next leading candidate. Likewise, at decision block 634, when the end of parse condition has not been met, the method will branch to step 610 (via connector A) despite the creation of a full-span parse tree.

Figure 7:
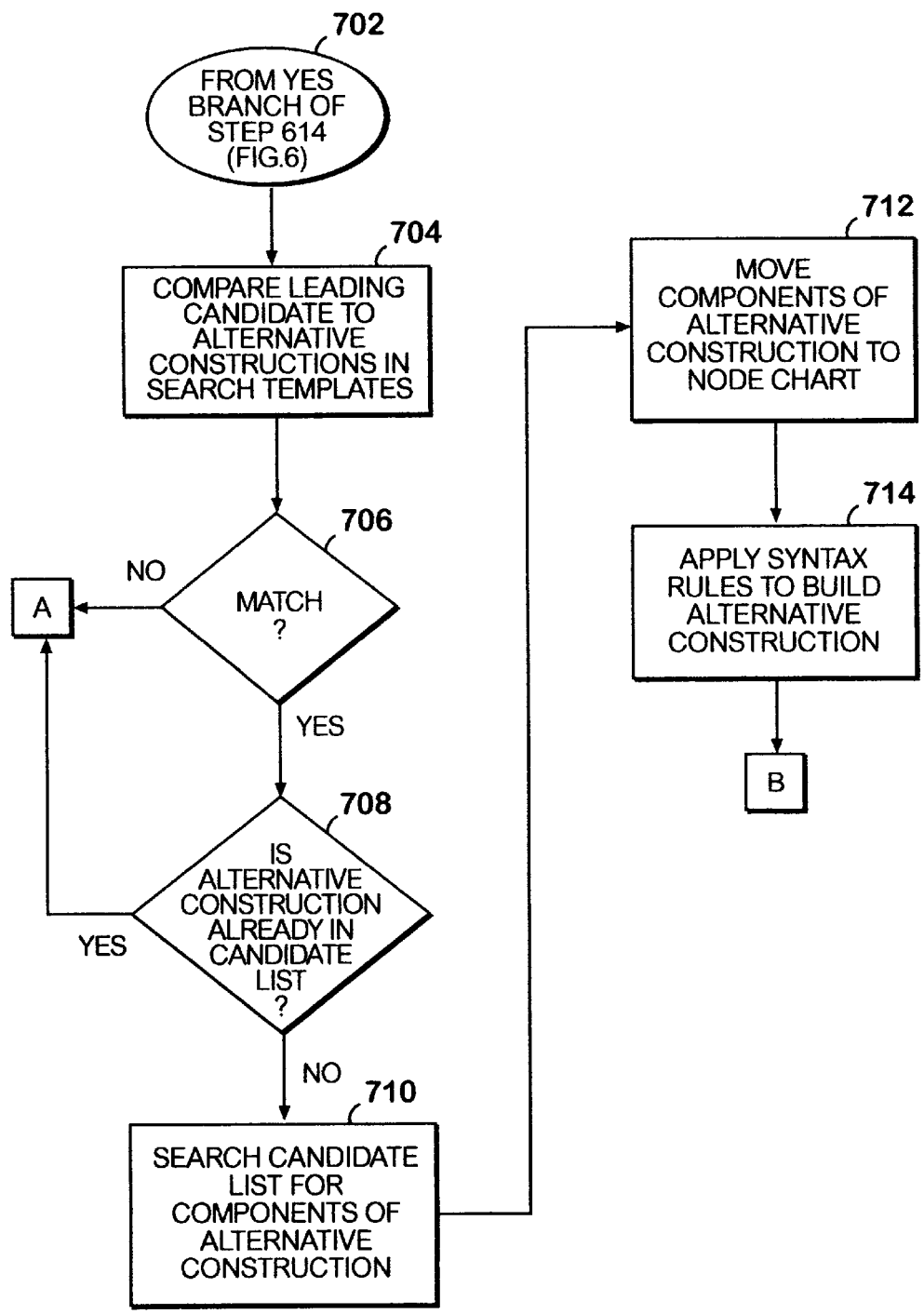
FIG. 7 is a flowchart further illustrating the method of operation of an embodiment of the present invention.

FIG. 7 provides a more detailed description of steps 616 and 618 in FIG. 6. Referring now to FIG. 7, the method 700 starts at step 702 and proceeds to step 704. At step 704, the leading candidate is compared to the alternative constructions in the template set. At decision block 706, a determination is made as to whether a match is found between the leading candidate and an alternative construction in the template set. If a match is not found, then the leading candidate is not a problematic construction, and the method branches back to step 610 (FIG. 6) (via connector A). If a match is found, then the leading candidate is a problematic construction and the method branches to decision block 708.

At decision block 708, a determination is made as to whether the alternative construction (of course there may be more than one) provided by the template is already in the candidate list. If the alternative construction is already in the candidate list, then there is no need to build it. In this case, the method branches back to step 620 (FIG. 6) (via connector B). If, however, the alternative construction is not in the candidate list, then it must be built and moved to the candidate list. In this case, the method branches to step 710.

At step 710, the candidate list is searched for the component nodes of the alternative construction. Because the alternative construction does not exist, it must be built. The first step to building the alternative construction is to find the components required to build the construction. The method then proceeds to step 712 and the components of the alternative construction are moved (promoted) to the node chart. At step 714, the syntax rules are applied to the promoted components and the alternative construction is built. If the components cannot be found or if the alternative construction cannot be built by applying the syntax rules, then the method abandons the attempt to build the alternative construction and attempts to build any other alternative constructions remaining in the template set.

Once an alternative construction has been built, then it will be placed in the candidate list and assigned a goodness measure, per the normal operation of the parser. Accordingly, the method proceeds back to step 610 (FIG. 6) (via connector A).

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

I claim:

1. A computer-implemented method of parsing a natural language input span, the method comprising the steps of:

breaking the input span into individual words;

looking up each individual word in a lexicon to determine at least one part of speech associated with the word;

storing each individual word and an associated part of speech as a node in a candidate list;

assigning a first goodness measure to a first one of the nodes in the candidate list;

determining a leading candidate node;

promoting the leading candidate node to a node chart;

comparing the leading candidate node to a template; and in response to a match between the leading candidate node and the template, generating an alternative node and storing the alternative node in the candidate list.

2. The computer-implemented method of claim 1, wherein the first goodness measure represents the likelihood that the first node is a component of an accurately parsed input span.

3. The computer-implemented method of claim 1, wherein the node chart comprises a plurality of nodes, the method further comprising the step of:

applying a syntax rule to a second node in the node chart to combine the second node with a third node in the node chart, thereby creating a fourth node.

4. The computer-implemented method of claim 3, further comprising the step of:

moving the fourth node to the candidate list and assigning a second goodness measure to the fourth node.

5. The computer-implemented method of claim 1, wherein each of the nodes in the candidate list has an associated goodness measure and wherein the step of determining the leading candidate node comprises the steps of:

comparing the goodness measures associated with each of the nodes in the candidate list; and selecting the node having the highest goodness measure associated thereto as the leading candidate node.

6. The computer-implemented method of claim 1, wherein:

the template comprises a plurality of alternative constructions; and each alternative construction comprises a sequence of constituents that is equivalent to the sequence of constituents of each other alternative construction in the template.

7. The computer-implemented method of claim 6, wherein the step of comparing the leading candidate node to the template comprises the step of:

comparing the leading candidate node to each alternative construction in the template.

8. The computer-implemented method of claim 7, wherein the step of generating an alternative node comprises the step of:

searching the candidate list for a node having an equivalent construction to a first alternative construction.

9. The computer-implemented method of claim 8, further comprising the step of:

in response to a failure to find a node having an equivalent construction to the first alternative construction, searching the candidate list for component nodes, each component node comprising at least one leaf node and having an equivalent construction to a corresponding constituent of the first alternative construction.

10. The computer-implemented method of claim 9, further comprising the steps of:

in response to finding the component nodes in the candidate list, moving the component nodes to the node chart; and applying a syntax rule to combine at least two of the component nodes into the alternative node.

11. A computer readable medium on which is stored computer-executable instructions for performing the steps of:

breaking an input span into a plurality of words;

associating each word with a part of speech;

storing each word and each associated part of speech as a leaf node;

following storing each word and each associated part of speech as a leaf node, combining leaf nodes to form intermediate-level nodes to a template; and in response to a match between one of the intermediate-level nodes and the template, creating an alternative node.

12. The computer readable medium of claim 11, wherein the step of associating each word with a part of speech comprises the steps of:

searching a lexicon for an entry corresponding to the word; and in response to finding the entry in the lexicon, determining at least one part of speech associated with the entry.

13. The computer readable medium of claim 11, herein the step of combining leaf nodes to form intermediate-level odes comprises the steps of:

finding a first leaf node that is adjacent to a second leaf node;

comparing the first leaf node to a syntax rule;

comparing the second leaf node to the syntax rule, in response to a match between the first leaf node and the syntax rule; and combining the first node and the second node to form an intermediate-level node, in response to a match between the second leaf node and the syntax rule.

14. The computer readable medium of claim 11, wherein:

the template comprises a plurality of alternative constructions; and each alternative construction comprises a sequence of constituents that is equivalent to the sequence of constituents of each other alternative construction in the template.

15. The computer readable medium of claim 14, wherein the step of comparing the intermediate-level nodes to the template comprises the step of:

comparing the intermediate-level nodes to each alternative construction in the template.

16. The computer readable medium of claim 15, wherein the step of creating the alternative node comprises the step of:

in response to a match between a first intermediate-level node and a first alternative construction in the template, searching for a second intermediate-level node having an equivalent construction to a second alternative construction in the template.

17. The computer readable medium of claim 16, further comprising the step of:

in response to a failure to find the second intermediate-level node having an equivalent construction to the second alternative construction, searching for component nodes, each component node comprising at least one leaf node and having an equivalent construction to a corresponding constituent in the second alternative construction.

18. The computer readable medium of claim 17, wherein the component nodes comprise at least one intermediate-level node.

19. The computer readable medium of claim 17, further comprising the step of:

in response to finding the component nodes, applying a syntax rule to combine at least two of the component nodes into the alternative node.

20. A computer-implemented method of increasing efficiency of a natural language parser for parsing an input span through the generation of an alternative node, the method comprising the steps of:

comparing each of a plurality of intermediate-level nodes to a template;

in response to a match between one of the intermediate-level nodes and the template, generating an alternative node.

21. The computer-implemented method of claim 20, wherein:

the template comprises a plurality of alternative constructions; and each alternative construction comprising a sequence of constituents that is equivalent to the sequence of constituents of each other alternative construction in the template.

22. The computer-implemented method of claim 21, wherein the step of comparing the intermediate-level nodes to the template comprises the step of:

comparing the intermediate-level nodes to a first alternative construction in the template.

23. The computer-implemented method of claim 22, wherein the step of generating an alternative node comprises the step of:

searching for a first intermediate-level node having an equivalent construction to the first alternative construction in the template.

24. The computer-implemented method of claim 23, further comprising the step of:

in response to a failure to find the first intermediate-level node having an equivalent construction to the first alternative construction, searching for component nodes, each component node comprising at least one leaf node and having an equivalent construction to a corresponding constituent node in the first alternative construction.

25. The computer-implemented method of claim 24, further comprising the step of:

in response to finding the component nodes applying a syntax rule to combine the component nodes into a new intermediate-level node.

* * * * *